United States Patent [19]

Nakagawa et al.

[11] 4,168,613
[45] Sep. 25, 1979

[54] OIL RESERVOIR DEVICE WITH OIL LEVEL DETECTOR MEANS FOR A TANDEM TYPE MASTER CYLINDER

[75] Inventors: Tadao Nakagawa; Itaru Hirayama; Hiroo Takeuchi, all of Ueda, Japan

[73] Assignee: Nisshin Kogyo Kabushiki Kaisha, Ueda, Japan

[21] Appl. No.: 930,854

[22] Filed: Aug. 3, 1978

Related U.S. Application Data

[63] Continuation of Ser. No. 665,317, Mar. 9, 1976, abandoned.

[30] Foreign Application Priority Data

Mar. 15, 1975 [JP] Japan .................................. 50-31296

[51] Int. Cl.² ........................ B60T 11/20; B60T 17/22
[52] U.S. Cl. ........................................ 60/562; 60/535;
60/588; 60/592; 137/576; 220/4 B; 340/52 C
[58] Field of Search ............... 60/534, 535, 545, 562,
60/581, 585, 588, 589, 592; 340/52 C; 137/571,
574, 576; 220/20, 22, 4 B, 4 E, 23.4

[56] References Cited

U.S. PATENT DOCUMENTS

| | | | |
|---|---|---|---|
| 3,020,978 | 2/1962 | Bocchino | 137/576 |
| 3,044,581 | 7/1962 | Lepelletier | 60/581 |
| 3,691,522 | 9/1972 | Hocking | 340/52 C |
| 3,744,513 | 7/1973 | Leitenberger | 60/562 |
| 3,914,943 | 10/1975 | Lewis | 60/585 |

FOREIGN PATENT DOCUMENTS

2339279 2/1974 Fed. Rep. of Germany ............. 60/535

Primary Examiner—Abraham Hershkovitz
Attorney, Agent, or Firm—Haseltine, Lake & Waters

[57] ABSTRACT

A device comprising two oil reservoir tanks communicating with the two respective oil-hydraulic chambers of a tandem type master cylinder and also with each other through an upper and a lower interconnecting oil passage. One of the two tanks has a top opening for oil filling use and normally closed with a vented cap while the other tank is closed at the top and provided therein with an oil level detector means which comprises a stationary reed switch connected with an appropriate external alarm circuit and a permanent magnet vertically movable with the oil level in the tank to close the reed switch as the volume of oil stored is reduced to a predetermined minimum. With the device, even if one of the two oil-hydraulic lines connected with the master cylinder fails to function due to oil leakage, the other line can properly function without any pressure failure as, in the associated tank, a predetermined minimum volume of oil remains on account of the height of the lower oil passage.

3 Claims, 3 Drawing Figures

OIL RESERVOIR DEVICE WITH OIL LEVEL DETECTOR MEANS FOR A TANDEM TYPE MASTER CYLINDER

This is a continuation of application Ser. No. 665,317 filed Mar. 9, 1976, now abandoned.

BACKGROUND OF THE INVENTION

This invention relates to oil reservoir devices for a tandem type master cylinder, which is typically usable in a dual line type oil-hydraulic brake system for automotive use and more particularly to those of the type provided with automatic oil level detector means for detecting any unusual decrease in volume of oil stored in the device and associated with an external alarm unit to energize the latter upon detection of such oil decrease.

Conventional forms of tandem type master cylinder and oil reservoir assembly, however, have generally involved such disadvantages as complexity of structure and high cost of fabrication as they have included two independent oil reservoir tanks respectively communicating with the two oil pressure chambers of the master cylinder, the two tanks being each provided with an oil filling or replenishing hole and also with means for detecting unusual fall of level of oil stored in the associated tank.

SUMMARY OF THE INVENTION

In view of the above, the present invention is intended to obviate the disadvantages previously involved and has for its object the provision of an improved oil reservoir device for a tandem type master cylinder which includes only a single oil level detector means in common to the two oil reservoir tanks and at all times enables the associated master cylinder and at least one of the two oil-hydraulic lines connected therewith to function in order, even if in either one of the two lines oil leakage occurs, by keeping the other, unleaky line from oil shortage.

The above and other objects, features and advantages of the present invention will become apparent from the following description when taken in conjunction with the accompanying drawings, which illustrate a few preferred embodiments of the invention.

BRIEF DESCRIPTION OF THE DRAWINGS

In the drawings:

FIG. 2 is a view similar to FIG. 1, illustrating another embodiment of the present invention; and FIG. 3 is a fragmentary cross-sectional view taken along the line A—A in FIG. 2.

DESCRIPTION OF THE PREFERRED EMBODIMENTS

Figure 1:
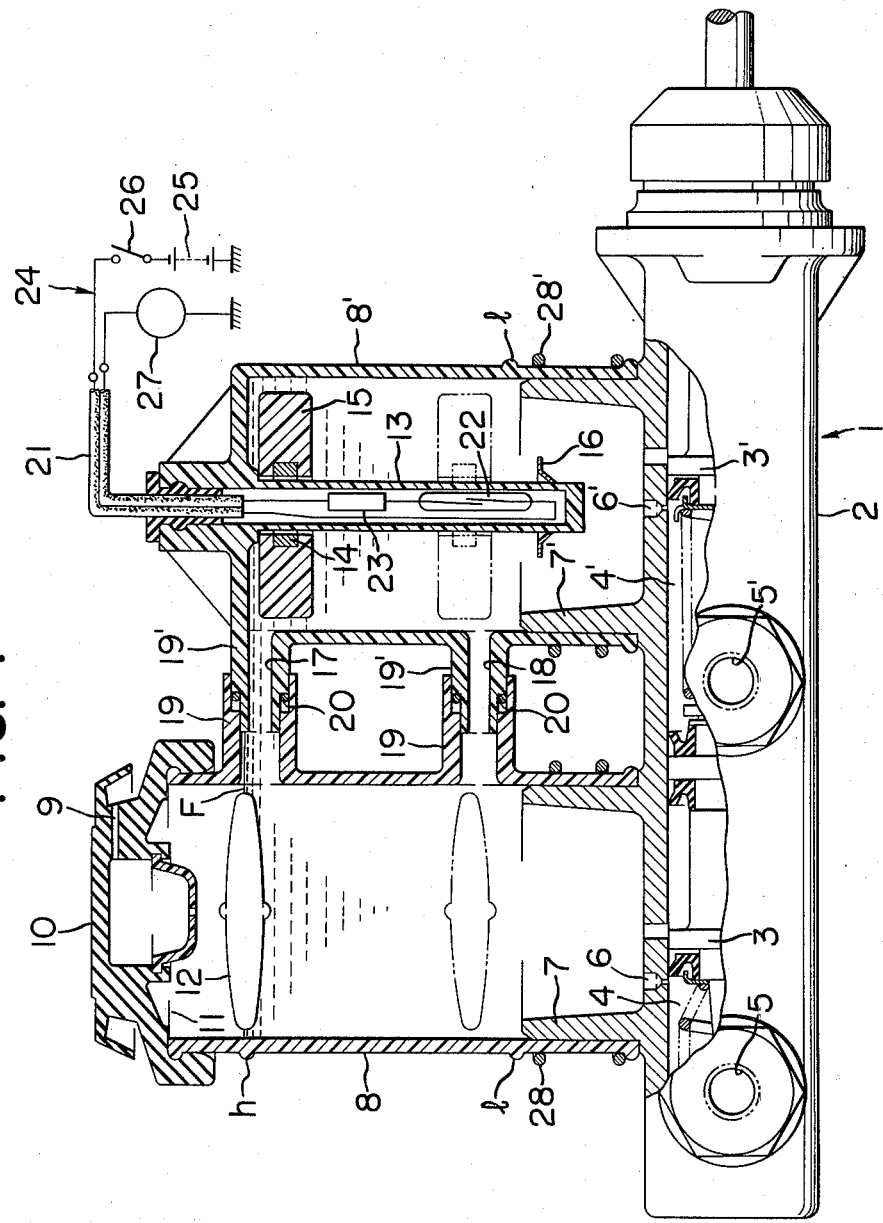
FIG. 1 is a longitudinal cross-sectional view of one embodiment of the invention, showing the essential structure thereof.

Referring first to FIG. 1, which illustrates one embodiment of the invention, reference numeral 1 generally indicates a tandem type master cylinder for a dual line oil-hydraulic brake system, which cylinder is conventional in basic structure, including a cylinder body 2 and a pair of front and rear hydraulic pistons 3 and 3' axially slidably fitted in the cylinder body 2 in such a manner as to be driven simultaneously by means of a brake pedal, not shown. A first and a second output port 5 and 5' are formed on one side of the cylinder body 2 and are in communication respectively with a first and a second oil-hydraulic pressure chamber 4 and 4' defined in the cylinder body 2 by the respective pistons 3 and 3'. It is to be understood that the output ports 5 and 5' are connected with the respective oil-hydraulic lines of a dual line type automotive brake system so that oil pressures developing in the respective pressure chambers 4 and 4' upon operation of the two hydraulic pistons 3 and 3' are fed into the respective associated oil-hydraulic lines of the brake system to actuate the associated wheel brakes.

As illustrated, the cylinder body 2 is formed on the top side thereof with a first and a second integral tubular joint formation 7 and 7', which are relatively short in height or axial length and spaced apart from each other, respectively communicating with the first and second oil pressure chambers 4 and 4' through respective apertures 6 and 6' formed in the top wall of the cylinder body 2. A first and a second oil reservoir tank 8 and 8' are fitted at the bottom thereof over the respective tubular joints 7 and 7'. Reference numerals 28 and 28' indicate bands employed to clamp the lower peripheral wall portions of the oil reservoir tanks, encircling the respective tubular joint formations 7 and 7', tightly against the outer periphery thereof; and reference character F indicates oil stored in the oil reservoir tanks 8 and 8' to be fed to the respective pressure chambers 4 and 4' of the cylinder body 2.

The two oil reservoir tanks 8 and 8' are both generally cylindrical in shape and desirably formed of a transparent synthetic resin material. The first oil reservoir tank 8 is formed open at the top, as indicated at 11, and the top opening 11 serves as an oil-filling or replenishing port common to the two oil reservoir tanks 8 and 8', as will be described later in further detail. A closure cap 10 of resilient material is removably fitted over the open top of the oil reservoir tank 8 and formed with a vent hole 9. The oil reservoir tank 8 is formed on the periphery thereof with a pair of upper and lower ribs h and l, which serve as a top and a bottom oil-level mark, respectively, indicating upper and lower limits of volume of working fluid or oil F to be stored in the divice. Arranged in the first oil reservoir tank 8 afloat on the surface of oil F stored therein is a float member 12 which serves to prevent any disturbance of the oil surface.

On the other hand, the second oil reservoir tank 8' is closed at the top, having a top wall which lies substantially at the same level as the top level mark or rib h formed on the outer periphery of the first oil reservoir tank 8. Extending vertically downwardly from the center of the top wall of the second oil reservoir tank 8' is an elongate tubular switch housing 13 which is relatively small in diameter and radially spaced from the inner periphery of the cylinderical oil reservoir tank 8' and terminates at the bottom at a level below a bottom oil level mark or rib l which is formed on the outer pheriphery of the second oil reservoir tank 8' at the same level as the bottom level mark l on the first oil reservoir tank 8. Arranged in the second oil reservoir tank 8' afloat on the oil surface therein is an annular float member 15 which is fitted over the tubular switch housing 13 for free rising and falling movement together with the oil surface in the tnk 8'. Reference numeral 16 indicates an annular stop member secured to the bottom end portion of the tubular switch housing 13 for abutting engagement with the float member 15 to serve the purpose of preventing the latter from falling apart from the tubular switch housing 13. As indicated at 14, an annular permanent magnet is embedded in the inner periphery of the annular float member 15 to serve the purpose described later.

The first and second oil reservoir tanks 8 and 8' are placed in communication with each other by fluid communication means including a lower oil passage 18, which extends between the two tanks at a level slightly higher than the bottom oil-level makrs l, and an upper oil passage 17, which extends between the tanks practically at the level of the underside of the top wall of the second oil reservoir tank 8' or at the highest possible level of oil therein. These oil passages 17 and 18 are each defined by a pair of slidably interfitting short tubular projections 19 and 19' formed integral with the respective oil reservoir tanks 8 and 8' on the spaced opposite sides thereof. Reference numeral 20 indicates an annular oil seal member interposed between the interfitting portions of tubular projections 19 and 19'. As will readily be appreciated, the oil reservoir tanks 8 and 8', being connected with each other by such fluid communication means, can be securely fitted over the respective tubular joint formations 7 and 7' irrespective of any manufacturing tolerance in center-to-center distance thereof owing to the axially slidably interfitting engagement of the tubular projections 19 and 19', formed on the respective tanks.

Accommodated in the tubular switch housing 13, formed integral with the second oil reservoir tank 8', are a magnetic-responsive, reed switch 22 and a protecting resistance 23 which are series-connected to lead wires 21 and positioned so that, if and when the float member 15 has descended substantially to the level of the bottom oil-level mark l, the reed switch 22 is closed under the magnetic effect of the permanent magnet 14, which is embedded in the float member 15. In this manner, the float member 15 carrying permanent magnet 14 and the reed switch 22 together form an oil level detector which serves the purpose of automatically detecting the fall of the oil level in the tanks to its lower limit.

Lead wires 21 are connected at their exterior terminals with an alarm circuit 24 which includes an automotive voltage source 25, a main switch 26 and an alarm unit 27 such as an electric lamp, which is mounted on the instrument panel of the automotive vehicle.

In use of the oil reservoir device described above, the two oil reservoir tanks 8 and 8' can be filled or replenished with oil F at the same time simply by pouring oil into the first oil reservoir tank 8 through the top opening 11 thereof as the two tanks are held in communication with each other by means of upper and lower oil passages 17 and 18. Further, even after the closure cap 10 has been applied to the top opening 11, the oil surfaces in both oil reservoirs 8 and 8' are held continually under the atmospheric pressure, which is led therein through the vent hole 9 formed in the closure cap 10. Under this condition, it is to be noted that the first and second oil pressure chambers 4 and 4' of the tandem type master cylinder 1 are kept safe from any oil shortage, at all times assuming the state filled up with oil from the respective oil reservoir tanks 8 and 8'.

Normally, when the volume of oil stored in the two oil reservoir tanks is within an appropriate range, the reed switch 22 is held open as the float member 15 floating on the oil surface in the oil reservoir 8' is in a position remote from the reed switch 22, as illustrated, thus keeping the latter out of the magnetic field of the permanent magnet 14, which is embedded in the float member 15. Accordingly, under this state, the alarm unit 27 is held inoperative even when the main switch 26 is closed to drive the vehicle.

Now assume that there occurs an oil leakage from the oil-hydraulic line connected with the first output port 5 of the master cylinder 1 and the oil surfaces in the two oil reservoirs 8 and 8' descend to a level substantially the same as that of the lower oil-level mark l. Apparently, in this case, the float member 15 descends together with the oil surface in the oil reservoir tank 8' along the tubular switch housing 13 and causes the reed switch 22 to be closed under the magnetic effect of the permanent magnet 14 so that the alarm unit 27 is energized to alarm the driver of the unusual descent of the level of oil stored.

In this connection, it is to be appreciated that, even if the oil leakage proceeds to deplete the first oil reservoir tank 8, oil remains held in the second oil reservoir 8' at least to the level of lower mark l as the lower oil passage 18 lies slightly higher than the latter, as described hereinbefore. Under this situation, whenever the master cylinder 1 is operated, the other, unleaky oil-hydraulic line of the brake system is fed with pressure oil from the second pressure chamber 4' of the master cylinder without fail effectively to actuate the brake units associated with such oil-hydraulic line.

At this stage, it is to be observed that the float member 15 is held at the level of lower mark l, bearing on the top edge of the second tubular joint 7' formed on the body of master cylinder 1. Accordingly, even if the oil level in the second oil reservoir tank 8' descends any further, the reed switch 22 remains closed and the alarming state is maintained.

In the case of failure of the other oil-hydraulic line, connected with the second output port 5' of the master cylinder 1, the device functions in substantially the same manner as described above except that a predetermined volume of oil F remains held this time in the first oil reservoir tank 8 and again the driver is alarmed of the unusual decrease in volume of oil stored in the device.

Figures 2, 3:
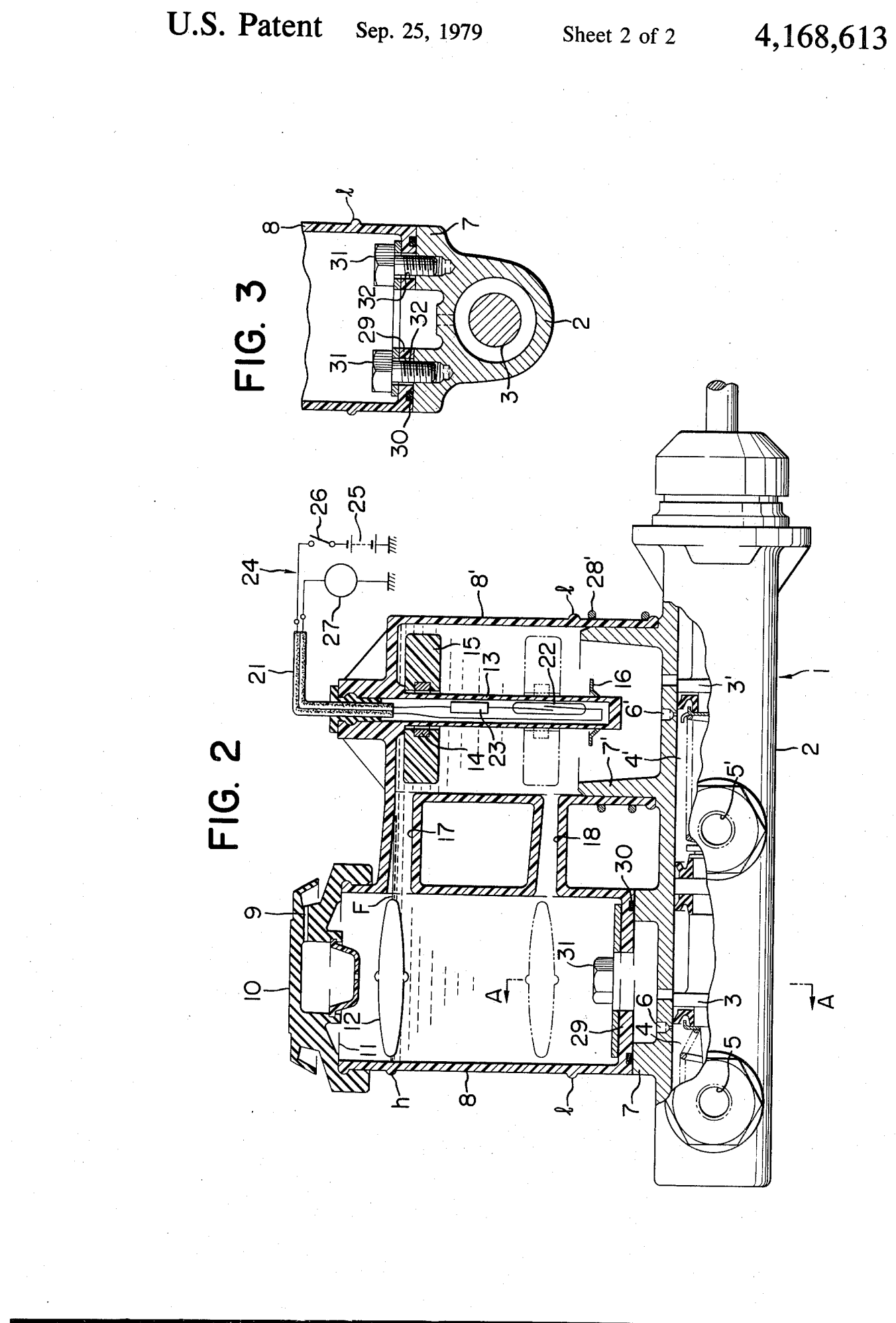

FIGS. 2 and 3 illustrate another preferred embodiment of the present invention, which includes a first and a second oil reservoir tank 8 and 8' formed integral with each other. The second oil reservoir 8' is fitted over a tubular joint 7' formed on the top side of the body 2 of the tandem type master cylinder 1, as with the case of the embodiment shown in FIG. 1, but the first oil reservoir tank 8 in this second embodiment is formed at the bottom with a radially inwardly extending annular flange 29, which is placed on the flat top edge of another tubular joint 7 which is formed on the cylinder body 2 and shorter in axial length or height than the tubular joint 7'. Reference numeral 30 indicates an annular oil seal member interposed between the annular flange 29 and tubular joint 7, which are fixed together by means of headed bolts 31 located radially inside of the oil seal member 30, as clearly shown in FIG. 3. Reference numeral 32 indicates through holes formed in the annular flange 29 to receive the respective bolts 31 and having a diameter substantially larger than that of the bolts to form around the latter a radial clearance sufficient to accommodate any possible manufacturing difference in center-to-center distance of the two oil reservoir tanks 8 and 8', on the one hand, and the two tubular joints 7 and 7', on the other hand. Other structural features of this embodiment and its function are substantially the same as those of the first embodiment shown in FIG. 1.

To summarize, the present invention has realized an improved oil reservoir device usable with a tandem type master cylinder, which includes two oil reservoir tanks secured to the master cylinder with an oil level detector means arranged in one of the oil tanks and principally comprised of a float member 15 carrying a permanent magnet 14 and a stationary reed switch 22 operable under the magnetic effect of the permanent magnet and has many advantages over the prior art as follows: First, any unusual descrease in volume of oil stored in the device, as resulting from oil leakage in the dual line type oil-hydraulic system connected with the tandem type master cylinder, can be detected immediately without fail and any malfunctioning of the master cylinder due to oil shortage therein can be effectively prevented. Further, even if any oil leakage takes place on one of the oil-hydraulic lines of the brake system, at least a predetermined minimum portion of the oil stored in that oil reservoir tank which is associated with the other, unleaky oil-hydraulic line is left stored in the tank, thus enabling the master cylinder to serve its intended function, actuating the unleaky oil-hydraulic line. It will thus be appreciated that the device of the present invention is highly reliable despite of its simple construction and limited cost of fabrication. Moreover, the two oil reservoir tanks of the device of the invention can be simultaneously filled or replenished with oil through an oil port formed only in one of the two oil reservoir tanks and, for the oil filling or replenishing operation, there is no need of removing the oil level detector means, which is provided in the other reservoir tank. This not only makes the device easy to handle but also eliminates any danger that the oil level detector means be inadvertently impaired, making the device further reliable.

Though a few preferred embodiments of the present invention have been shown and described, it will be apparent to those skilled in the art that many changes and modifications may be made therein without departing from the spirit of the invention or the scope of the appended claims.

What is claimed is:

1. An oil reservoir device with oil level detector means for a tandem type master cylinder of a dual line type oil-hydraulic system, comprising: a first and a second oil reservoir tank held in fluid communication with two respective oil pressure chambers of said tandem type master cylinder to feed said respective chambers with oil stored therein, said first oil reservoir tank having an oil filling top opening with a vented closure cap removably fitted thereto, said second oil reservoir tank being closed at the top; fluid communication means between said first and second oil reservoir tanks and including a lower oil passage extending between said tanks at a predetermined low level and an upper oil passage extending between said tanks at a level substantially higher than that of said lower oil passage, oil level detector means arranged in said closed second tank for warning of a shortage of oil in said tank, said detector means comprising a switch housing integrally formed with and depending from the closed top of said second tank, a float member fitted over said switch housing for vertical movement therealong, a permanent magnet carried by said float member, and a reed switch disposed in said switch housing at a predetermined fixed position and adapted to be closed under the magnetic effect of said magnet to produce an alarm signal when said float member descends to a predetermined lowest oil level substantially corresponding to said lower oil passage.

2. A device as claimed in claim 1, wherein said first and second tanks are formed separate from each other and from said master cylinder and connected thereto in respective predetermined positions, said upper and lower oil passages having axial projections extending from the adjacent side walls of said first and second tanks, said projections being axially slidably connected with each other for adjustment in axial length upon assembly of the device.

3. A device as claimed in claim 1, in which the first and second oil reservoir tanks (8, 8') are formed integral with each other and separate from the master cylinder (1), one of the two oil reservoir tanks (8') adapted to be connected to the master cylinder in a predetermined position while the other oil reservoir tank (8) is adapted to be connected to the master cylinder in a position properly selected along the latter.

* * * * *